United States Patent
Weng et al.

(10) Patent No.: US 6,557,358 B2
(45) Date of Patent: May 6, 2003

(54) NON-HYDROCARBON ULTRA-LOW TEMPERATURE SYSTEM FOR A REFRIGERATION SYSTEM

(75) Inventors: Chuan Weng, Weaverville, NC (US); Allan Kelly, Hendersonville, NC (US)

(73) Assignee: Kendro Laboratory Products, Inc., Asheville, NC (US)

( * ) Notice: Subject to any disclaimer, the term of this patent is extended or adjusted under 35 U.S.C. 154(b) by 0 days.

(21) Appl. No.: 10/015,776

(22) Filed: Dec. 17, 2001

(65) Prior Publication Data

US 2003/0010042 A1 Jan. 16, 2003

Related U.S. Application Data

(60) Provisional application No. 60/301,137, filed on Jun. 28, 2001.

(51) Int. Cl.[7] ............................................. F25B 41/00
(52) U.S. Cl. ................................................ 62/114; 252/67
(58) Field of Search .......................... 62/114, 468, 470; 252/67, 68

(56) References Cited

U.S. PATENT DOCUMENTS

| | | | | |
|---|---|---|---|---|
| 6,000,233 A | * | 12/1999 | Nishada et al. | ................ 62/114 |
| 6,205,795 B1 | * | 3/2001 | Backman et al. | ............... 62/79 |
| 6,324,856 B1 | * | 12/2001 | Weng | .......................... 62/175 |
| 6,374,629 B1 | * | 4/2002 | Oberle et al. | ................. 62/473 |

* cited by examiner

Primary Examiner—William C. Doerrler
Assistant Examiner—Malik N. Drake
(74) Attorney, Agent, or Firm—Baker & Hostetler LLP

(57) ABSTRACT

Methods and apparatus for non-hydrocarbon design of ultra-low temperature refrigeration systems, which are particularly suited a non-hydrocarbon ultra-low temperature refrigeration system that can safely be transported and applied in the field as needed without the risks associated with hydrocarbon ultra-low temperature refrigeration system are disclosed. An application of the non-hydrocarbon design of ultra-low temperature refrigeration system method and apparatus to freezers and the like is also disclosed.

20 Claims, 6 Drawing Sheets

NON-HYDROCARBON ULTRA-LOW TEMPERATURE SYSTEM FOR A REFRIGERATION SYSTEM

PRIORITY

This application claims priority to the provisional patent application, 60/301,137 filed Jun. 28, 2001, the disclosure of which is incorporated herein by reference.

FIELD OF INVENTION

The present invention relates generally to an apparatus for low temperature refrigeration systems. More particularly, the present invention relates to a non-hydrocarbon design of ultra-low temperature refrigeration systems.

BACKGROUND OF THE INVENTION

In refrigeration systems, a refrigerant gas is compressed in a compressor unit. Heat generated by the compression is then removed generally by passing the compressed gas through a water or air cooled condenser coil. The cooled, condensed gas is then allowed to rapidly expand into an evaporating coil where the gas becomes much colder, thus cooling the coil and the inside of the refrigeration system box around which the coil is placed.

In the compressor unit one or more chambers are provided which force the refrigerant from an inlet side at a low pressure to an outlet side at a high pressure. Valves prevent the high pressure gas from escaping back to the low pressure side from the high pressure side. The compressor unit will be partially filled with a refrigerant oil to lubricate and seal moving parts. A small amount of this lubricant continuously circulates throughout the refrigeration system In some multi-stage refrigeration systems, a first refrigeration system will be used to cool the refrigerant gas in a second stage. A problem which arises in these systems is that compressor oil in the second stage evaporating coil or expansion device becomes too viscous thereby inhibiting its ability to flow and return to the compressor.

To combat this problem, small amounts of hydrocarbons (HC) such as propane, ethylene, or propylene have been mixed with the refrigerant gas in the second, i.e., lower temperature, stage in order to maintain low viscosity of the compressor oil. The foregoing hydrocarbons are generally very compatible and miscible in their liquid form with typical compressor oils of mineral oil and alkyl benzene types at low temperature. This compatibility and miscibility has helped prevent compressor oil from being frozen in the low temperature region.

Due to their flammable properties, use of these hydrocarbons in refrigeration equipment has become a public concern particularly with respect to safe transportation and product application. Flammable refrigerants require additional safety precautions, invite regulatory agency scrutiny, require costly flammability tests, may have negative customer perception, and as stated earlier may complicate transportation needs. There is therefore a need to redesign the low temperature stage of these ultra-low temperature refrigeration systems so that no hydrocarbons are utilized, thus eliminating flammable refrigerant additives while maintaining performance, reliability, agency listings, and manufacturability. A successful design of non-hydrocarbon ultra-low temperature refrigeration systems that allows for shipping and applying such systems in the field without conflicting with safety regulations is desired.

SUMMARY OF THE INVENTION

The present invention overcomes the need for using hydrocarbons in a refrigeration system by utilizing refrigerants R134a, R404a, and/or R508b. To achieve desired properties, these refrigerants may be used alone or in a "cocktail" mixture. For example, refrigerant R134a has an advantage of being a pure refrigerant but has a high deviation from R508b's boiling point. Refrigerant R404a has an advantage of having a boiling point that is appropriate for less off-set from the boiling point of R508b but is a mixture of three HFCs (R125+R143a+R134a). Refrigerant R508b may be used at 100% level but may upset the energy balance of a cascade refrigeration system especially at a high ambient temperature level.

It is therefore a feature and advantage of the present invention to provide a non-hydrocarbon ultra-low temperature refrigeration system that can safely be transported and applied in the field as needed without the risks associated with hydrocarbon ultra-low temperature refrigeration systems and the like.

It is another feature and advantage of the present invention to provide a non-hydrocarbon ultra-low temperature refrigeration system that utilizes hydrofluorocarbon (HFC) refrigerants which expand the temperature glide between the bubble point and the dew point of a mixture. This temperature glide expansion allows the refrigerant liquid mixture to exist at much warmer temperatures in order to "wet" the evaporator interior surface for a flushing effect.

It is another feature and advantage of the present invention to provide a non-hydrocarbon ultra-low temperature refrigeration system which reduces the freezing point of the compressor oil and refrigerant mixture below a typical level for a two-stage cascade refrigeration system.

It is another feature and advantage of the present invention to provide a non-hydrocarbon ultra-low temperature refrigeration system that utilizes an oil separator in the low/second stage of the system which balances between the saturation level of the compressor oil in the refrigerant mixture and the efficiency of the oil separator. This oil separator prevents the low temperature refrigerant mixture from becoming overburdened by the oil residue from the compressor while it still achieves the necessary and desired performance for the ultra-low temperature refrigeration system.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purposes of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

DETAILED DESCRIPTION OF PREFERRED EMBODIMENTS OF THE INVENTION

Figure 1:
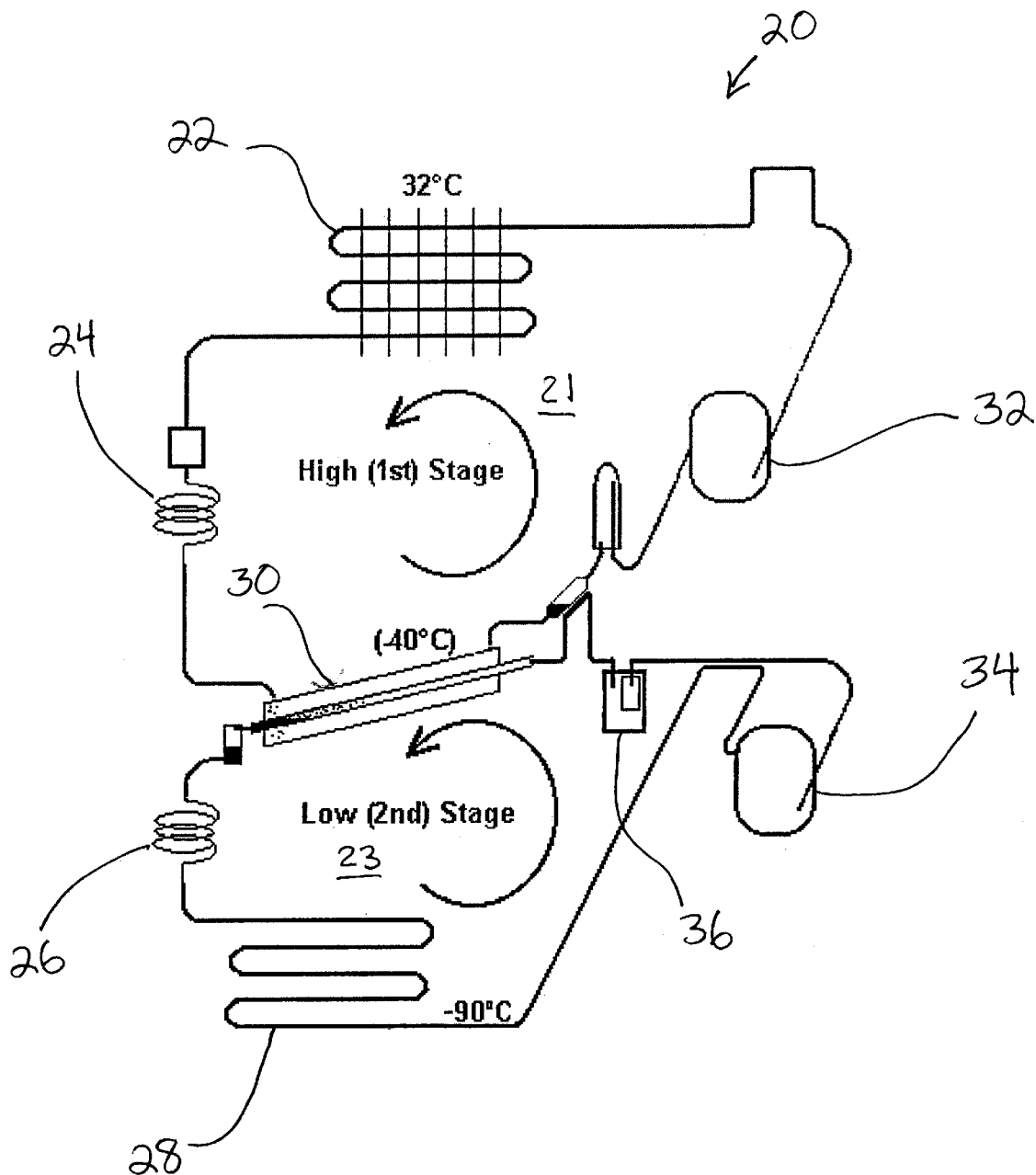
FIG. 1 illustrates the two-stage ultra low refrigeration system of one embodiment of the present invention.

Referring now to the Figures, in FIG. 1 there is shown a two-stage ultra-low temperature refrigeration system 20 including a high/first stage condenser 22, a low/second stage capillary 26, a high/first stage capillary 24, a low/second stage evaporator 28, a cascade heat exchanger 30, a high/first stage compressor 32, a low/second stage compressor 34 and an oil separator 36.

The present invention involves the improvement of high/first stage 21 performance on the propane-free design on upright ultra-low temperature refrigeration systems 20 which generally are thirteen, seventeen, or twenty-one cubic feet in size. In one preferred embodiment of the present invention, the total first stage charge has been reduced by 10% (from 24.5 oz to 22.25 oz) to achieve a colder heat exchanger temperature. This colder heat exchanger temperature allows the low/second stage refrigerant to condense at a lower temperature, and therefore yields a colder final evaporator temperature. For example, for a twenty-one cubic feet upright freezer, the reduced high/first stage charge of 22.25 oz. (6.75 oz. R134a refrigerant and 15.5 oz. R404a refrigerant mixture) at an ambient temperature of 21° C. could attain a cabinet temperature of −88.4° C. which is within the vicinity of the −90° C. desired temperature of a twenty-one cubic feet upright ultra-low temperature freezer utilizing hydrocarbons such as propane The low/second stage 23 uses HFC refrigerants as additives to R508b refrigerant in the low/second stage 23 of the two-stage cascade refrigeration system 20. A polyol ester (POE) compressor lubricant is used in the system. The use of POE in the compressor is an improvement over the use of mineral oils. Mineral oils tend to precipitate wax when cooled making them poor choices for ultra-low temperature uses. Mineral oils separate at relatively warm (−50 to −80° C.) temperatures and risks oil logging. The present invention is capable of removing residual compressor oil in the low temperature region by adding hydrofluorocarbon refrigerants such as R134a and R404a to R508b which expand the temperature glide between the bubble point and the dew point of the mixture. This allows the refrigerant liquid mixture to exist at much warmer temperatures to "wet" the evaporator interior surface which results in a flushing effect on the residual compressor oil.

Furthermore, the present invention uses refrigerant liquids such as R134a, R404a and R508b with high miscibility with typical POE oil molecular structures. This reduces the freezing point of the oil and refrigerant mixture to a level which is below the typical level of a two-stage cascade refrigeration system.

In addition, the application of an oil separator 36 in the low/second stage 23 is critical to maintaining acceptable low oil circulation levels. With an approximately 10 to 16% hydrofluorocarbon addition rate in the low/second stage 23, the low temperature refrigerant mixture is not overburdened by the potential oil residue while it still achieves the desired performance for the ultra-low temperature refrigeration system 20.

A comparison between ultra-low temperature refrigeration systems with and without a propane charge is shown below:

| Parameters | Performance-Reliability Indicators | |
|---|---|---|
|  | ULT w/Propane<br>1st Stage Charge:<br>70% R404a + 30% R134a<br>2nd Stage Charge:<br>84% R508b + 16% R290<br>Avg. Test Results | ULT w/o Propane<br>1st Stage Charge:<br>70% R404a + 30% 134a<br>2nd Stage Charge:<br>90%R 508b + 10% R404a<br>Avg. Test Results |
| 1st Discharge Pressure | 216.6 psia | 212.7 psia |
| 1st Suction Pressure | 16.2 psia | 15.0 psia |
| 1st Delta Pressure | 200.4 psi | 197.7 psi |
| 1st Compression Ratio | 13.4 | 14.2 |
| 2nd Discharge Pressure | 131.3 psia | 123.7 psia |
| 2nd Suction Pressure | 11.6 psia | 10.5 psia |
| 2nd Delta Pressure | 119.7 psi | 113.2 psi |
| 2nd Compression Ratio | 11.3 | 11.8 |
| Condenser Outlet (C) | 36.3 | 36.0 |
| 1st Suction Temp. (C) | −5.7 | −6.0 |
| 1st Discharge Temp. (C) | 104.4 | 102.1 |
| 1st Compressor Oil Sump (C) | 83.2 | 89.2 |
| 2nd Suction Temp. (C) | −23.4 | −23.5 |
| 2nd Discharge Temp. (C) | 103.3 | 100.3 |
| 2nd Compressor Oil Sump (C) | 92.6 | 94.6 |
| Rod Wear After 6 mos. At 110 F Life Test | No Detectable Wear | No Detectable Wear |

Based on the above table, bearing loads are virtually the same in both the ultra-low temperature refrigeration system with a propane charge and the ultra-low temperature refrigeration system without a propane charge because of a very similar delta pressure across the high and low sides or stages of the system. The temperatures are also comparable given that the small variations are within the margin of measuring error. It should also be noted that the lift test at 110° F. for six months showed no detectable wear on the ultra-low temperature refrigeration units.

Figure 2:
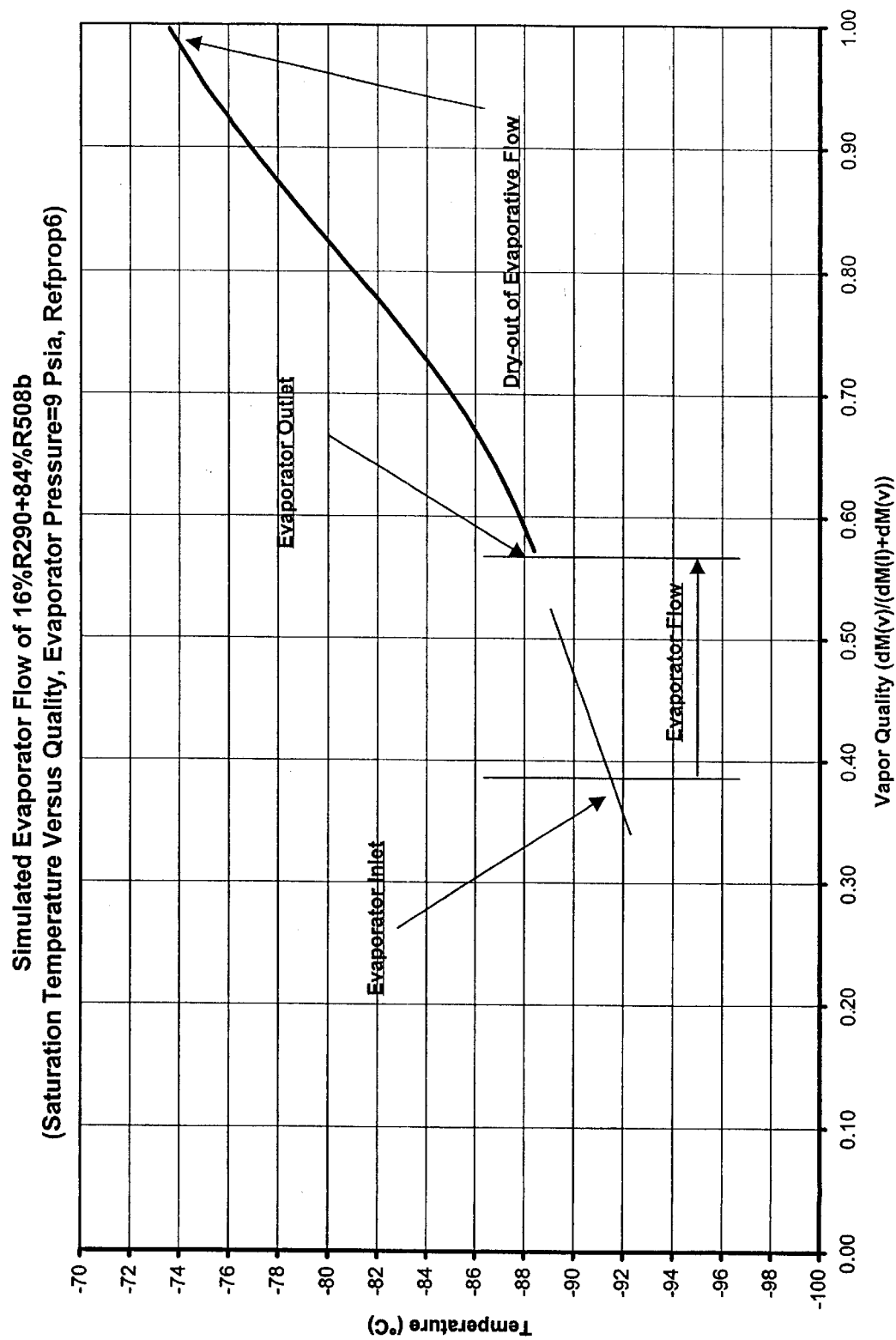
FIG. 2 illustrates evaporator flow of a 16%R290+84%R508b refrigerant mixture of a conventional hydrocarbon refrigeration system.
Figure 3:
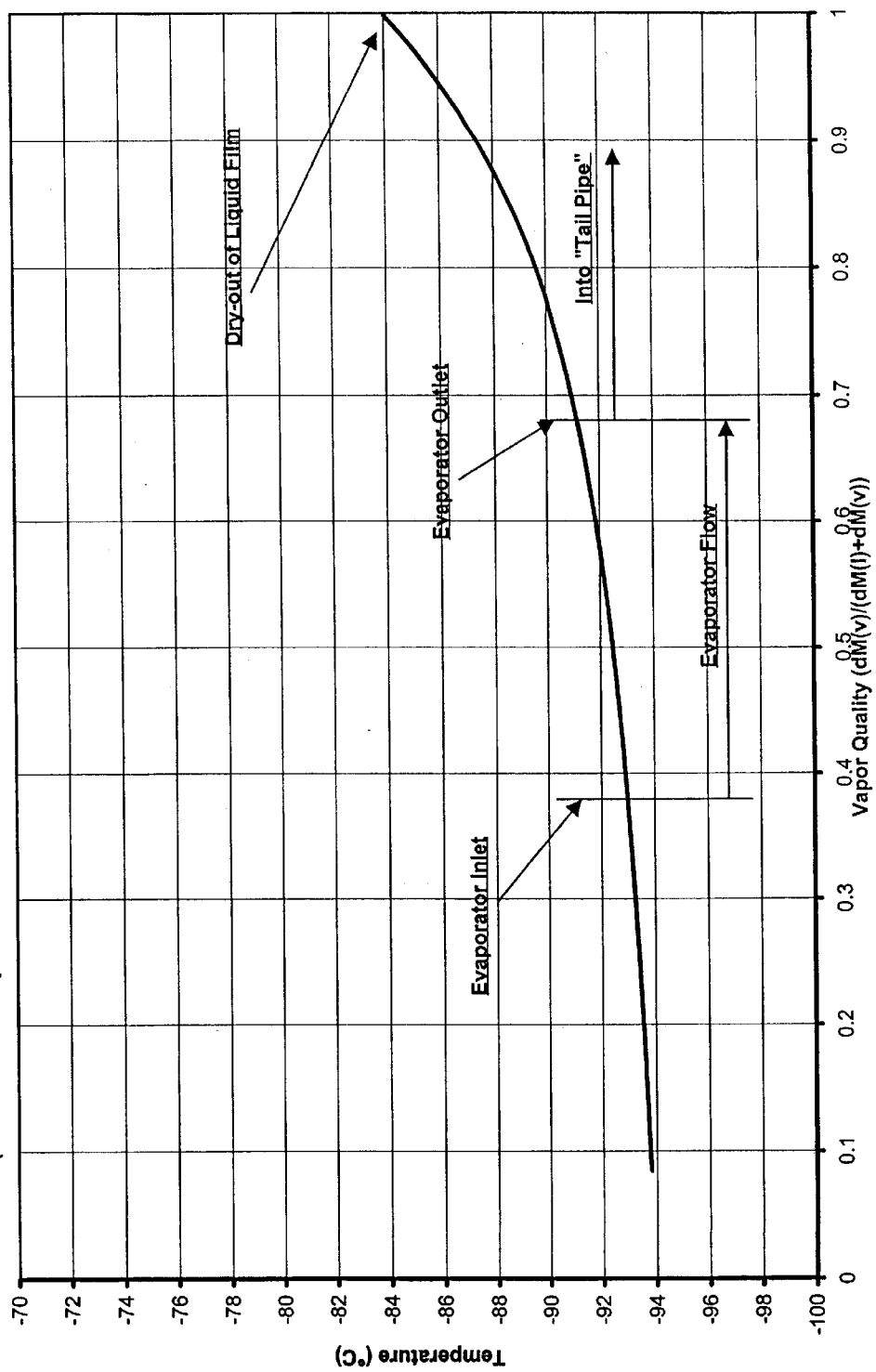
FIG. 3 illustrates evaporator flow of a 10%R404a+90%R508b refrigerant mixture of one embodiment of the present invention.

Referring to FIGS. 2 and 3, both refrigerants R290 and R404a provide excellent temperature glide to extend the liquid flows in the evaporator 28 when added to refrigerant R508b.

Figure 4:
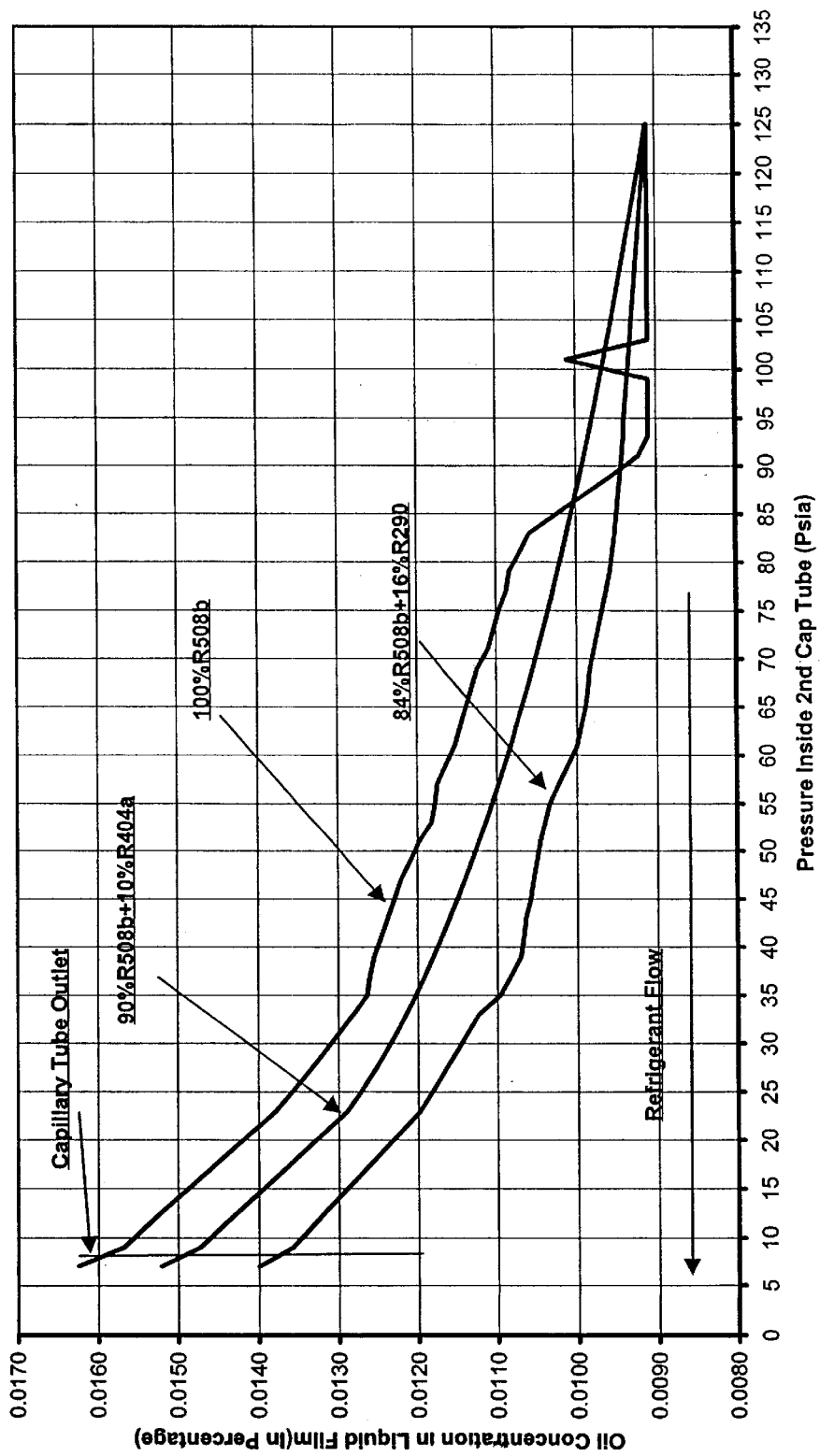
FIG. 4 illustrates oil concentration in liquid film without an oil separator.

Referring to FIG. 4, the oil concentration of the 90%R508b+10%R404a refrigerant mixture and the 84%R508b+16%R290 are lower than the pure 100%R508b refrigerant. Thus, leading to the present invention having a propane-free design with the use of HFC refrigerant R404a instead of refrigerant R290 (propane).

Figure 5:
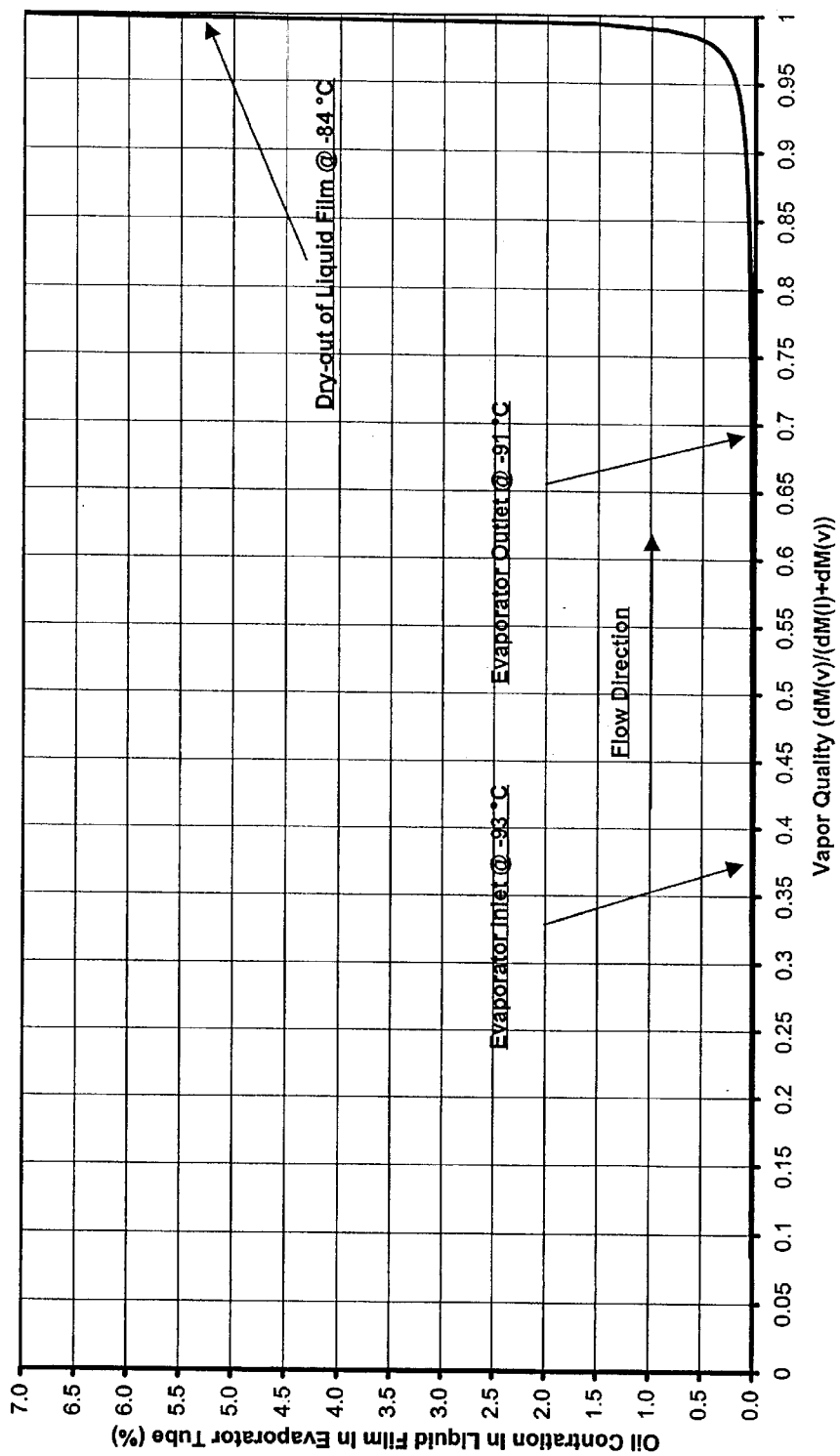
FIG. 5 illustrates oil concentration in liquid film in an evaporator tube without an oil separator for a 10%R404a+90%R508b refrigerant mixture of one embodiment of the present invention.
Figure 6:
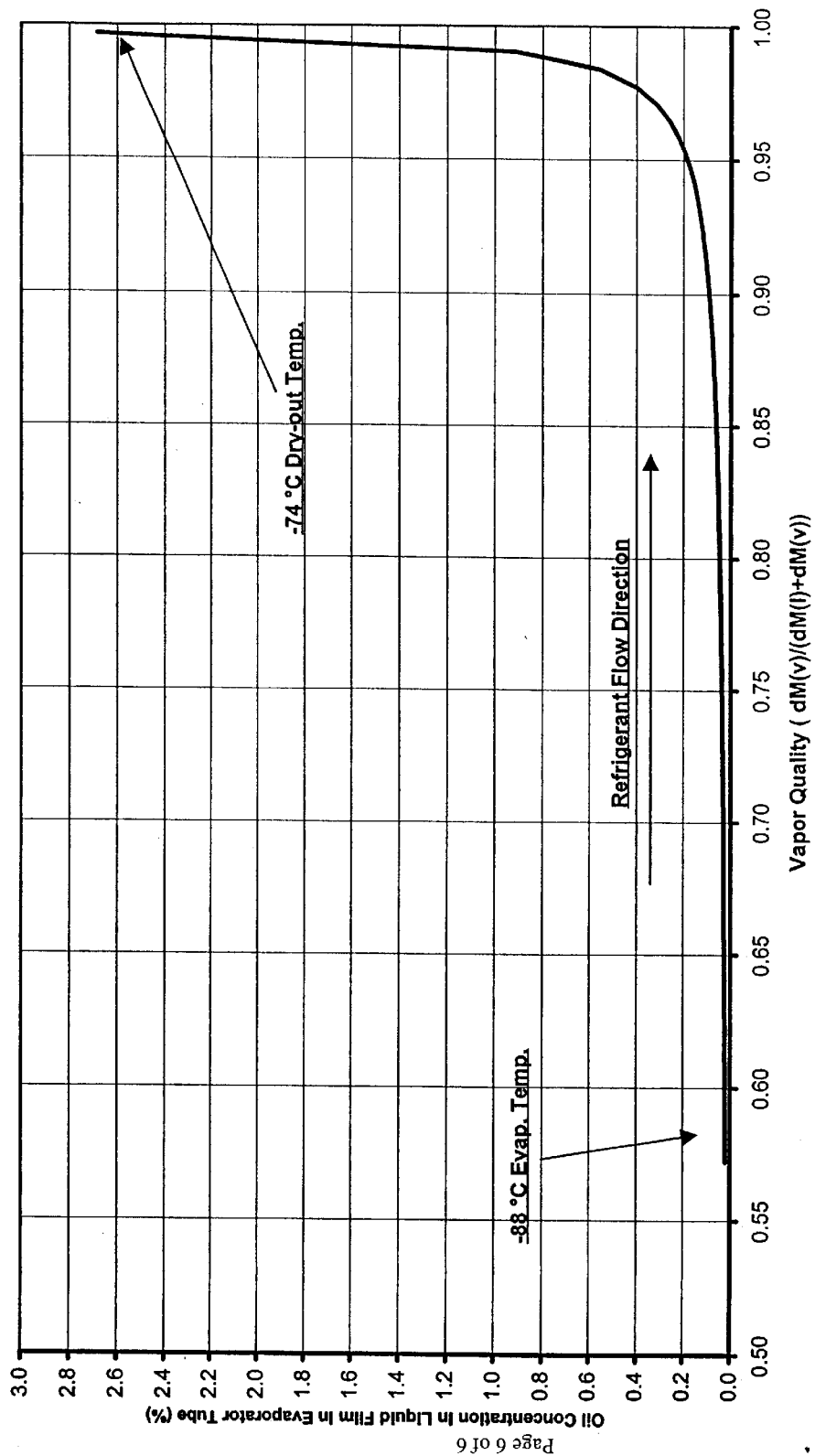
FIG. 6 illustrates oil concentration in liquid film in an evaporator tube without an oil separator for a 16%R290+84%R508b refrigerant mixture of a conventional hydrocarbon refrigeration system.

Referring to FIGS. 5 and 6, the refrigerant mixture of 10%R404a+90%R508b and the refrigerant mixture of 16%R290+84%R508b each reduce oil concentration in liquid film to minimum levels. However, the mixture of 10%R404a+90%R508b refrigerants increases to approximately 7% at "dry-out conditions" (i.e., vapor quality equals 1.0) and the mixture of 16%R290+84%R508b increases to approximately 3% at dry-out conditions. This indicates that refrigerant R290 depresses oil residue concentrations and prolongs liquid flow length outside of the evaporator 28. Thus, both R290 and R404a provide excellent temperature glide to extend the liquid flows through the evaporator 28. Again, suggesting the use of HFC refrigerant R404a instead of R290.

Furthermore, using either refrigerants R290 or R404a as additives to refrigerant R508b results in laminar flow with low Reynolds numbers for liquid film flow. Thus, R290 and R404a each provides equivalent oil carrying capability making refrigerant R404a a good alternative to refrigerant R290 in evaporator flow requirements.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A method of creating a non-hydrocarbon refrigerant mixture, comprising the steps of:

adding hydrofluorocarbon refrigerants to refrigerant R508b which expand a temperature glide between the bubble point and dew point of said refrigerant mixture and reduces the freezing point of a compressor oil and said refrigerant mixture for a two-stage cascade refrigeration system and balancing a low stage of said two-stage cascade refrigeration system between the saturation level of said compressor oil in the refrigerant mixture and the efficiency of the oil separator.

2. The method of claim 1, wherein said compressor oil is a polyol ester lubricant.

3. The method of claim 2, wherein said hydrofluorocarbon refrigerants are any one of the group consisting of R134a and R404a.

4. The method of claim 3, wherein said refrigerants R508b and R134a are present in said low stage of said two-stage cascade refrigeration system at approximately 90% and 10% ratios, respectively.

5. The method of claim 4, wherein said refrigerants R508b and R404a are present in said low stage of said two-stage cascade refrigeration system at approximately 90% and 10% ratios, respectively.

6. The method of claim 1, wherein said balancing step utilizes an oil separator which further prevents the low temperature refrigerant mixture from overburdening the low stage evaporator or expansion device with oil residue.

7. A non-hydrocarbon refrigeration system, comprising:

means for expanding a temperature glide between the bubble point and dew point of a mixture and for reducing the freezing point of a compressor oil and refrigerant mixture for a two-stage cascade refrigeration system, and means for balancing a low stage of said two-stage cascade refrigeration system between the saturation level of said compressor oil in the refrigerant mixture and the efficiency of the oil separator.

8. The refrigeration system of claim 7, wherein said compressor oil is a polyol ester lubricant.

9. The refrigeration system of claim 7, wherein said means for expanding a temperature glide and for reducing the freezing point of a compressor oil and said refrigerant mixture are hydrofluorocarbon refrigerants added to refrigerant R508b.

10. The refrigeration system of claim 9, wherein said hydrofluorocarbon refrigerants are any one of the group consisting of R134a and R404a.

11. The refrigeration system of claim 10, wherein said refrigerants R508b and R134a are present in said low stage of said two-stage cascade refrigeration system at approximately 90% and 10% ratios, respectively.

12. The refrigeration system of claim 10, wherein said refrigerants R508b and R404a are present in said low stage of said two-stage cascade refrigeration system at approximately 90% and 10% ratios, respectively.

13. The refrigeration system of claim 7, wherein said means for balancing a low stage of said two-stage cascade refrigeration system between the saturation level of said compressor oil in the refrigerant mixture is an oil separator.

14. A non-hydrocarbon refrigeration system, comprising:

a high stage which includes a refrigeration circuit including a compressor, a condenser, capillaries, and a cascade heat exchanger and a low stage which includes refrigeration circuit having a compressor, an evaporator, capillaries, and said cascade heat exchange in common with said high stage, wherein said low stage comprises a refrigerant mixture of hydrofluorocarbon refrigerant added to refrigerant R508b.

15. The system of claim 14, wherein said hydrofluorocarbon refrigerants are any of the group consisting of R134a and R404a.

16. The refrigeration system of claim 15, further comprising an oil separator in said low stage of said two-stage cascade refrigeration system.

17. The refrigeration system of claim 15, wherein said refrigerants R508b and R134a are present in said low stage of said two-stage cascade refrigeration system at approximately 90% and 10% ratios, respectively.

18. The refrigeration system of claim 15, wherein said refrigerants R508b and R404a are present in said low stage of said two-stage cascade refrigeration system at approximately 90% and 10% ratios, respectively.

19. The refrigeration system of claim 15, wherein said refrigerant mixture comprises at least 10% but not more than 16% of refrigerant R404a by volume.

20. The refrigeration system of claim 15, wherein said refrigerant mixture comprises at least 10% but not more than 16% of refrigerant R134a by volume.

* * * * *